United States Patent [19]
Olsen

[11] Patent Number: 5,338,783
[45] Date of Patent: Aug. 16, 1994

[54] SILICONE BINDER MATERIAL AND PRODUCTS FORMED THEREFROM

[75] Inventor: Thomas O. Olsen, Wichita, Kans.

[73] Assignee: STC, Inc., Wichita, Kans.

[21] Appl. No.: 804,963

[22] Filed: Dec. 11, 1991

[51] Int. Cl.$^5$ ............................................. C08K 3/00
[52] U.S. Cl. ........................................ 524/3; 524/437;
524/445; 524/446; 524/588; 428/331;
106/287.1; 106/287.34; 106/400; 106/457;
106/467; 106/468
[58] Field of Search ............... 428/331; 524/437, 445,
524/446, 588, 3; 106/103, 287.1, 287.34, 400,
457, 467, 468

[56] References Cited

U.S. PATENT DOCUMENTS

| | | | |
|---|---|---|---|
| 2,751,314 | 6/1956 | Keil | 117/72 |
| 2,934,464 | 4/1960 | Hoffman | 154/43 |
| 2,979,420 | 4/1961 | Harper | 117/72 |
| 3,455,732 | 7/1969 | Hathaway | 117/132 |
| 3,904,566 | 9/1975 | Cudby | 524/588 |
| 3,959,203 | 5/1976 | Keil | 524/588 |
| 3,996,188 | 12/1976 | Laur | 260/37 SB |
| 4,059,551 | 11/1977 | Weiant et al. | 524/588 |
| 4,105,617 | 8/1978 | Clark et al. | 260/31.2 N |
| 4,144,216 | 3/1979 | Clark et al. | 260/31.2 R |
| 4,231,917 | 11/1980 | Zeldin et al. | 524/8 |
| 4,297,265 | 10/1981 | Olsen | 260/33.6 SB |
| 4,680,364 | 7/1987 | Lucas | 528/15 |
| 4,683,251 | 7/1987 | Mikami | 522/46 |

*Primary Examiner*—Melvyn I. Marquis
*Assistant Examiner*—Karen A. Dean
*Attorney, Agent, or Firm*—Shook, Hardy & Bacon

[57] ABSTRACT

A silicone rubber binder composition is provided which includes silicone rubber, silicone dioxide and an aggregate such as sand, gravel, cinders and the like. The silicone rubber is preferably an RTV silicone rubber which is solubilized using a solvent and mixed with the silicone dioxide and aggregate. The mixture may be spray applied to form a roofing coating or may be molded to form another building element such as a beam, post, block, shingle, wallboard or the like.

15 Claims, 1 Drawing Sheet

SILICONE BINDER MATERIAL AND PRODUCTS FORMED THEREFROM

BACKGROUND OF THE INVENTION

This invention relates generally to building materials and, more particularly, to a silicone rubber composition useful for building purposes and building elements formed from such composition.

Silicone rubber compositions have been used as waterproofing materials for a variety of applications such as providing a waterproof coating for existing building roofs. Silicone rubbers have also been extensively used in other applications because they are generally unaffected by wide temperature variations and resist the deteriorating effects of acids, bases, salts and UV radiation. An example of one such application is disclosed in my previous U.S. Pat. No. 4,297,265 which discloses the application of a solubilized silicone rubber and silicon dioxide composition onto flexible substrates such as glass cloth for use as awnings or other flexible building structures. Other uses of silicone rubber are disclosed in U.S. Pat. Nos. 2,751,314, 2,934,464, 2,979,420 and 3,455,762.

Roofing elements such as shingles can be made from a variety of materials such as tile, slate, wood, concrete and compositions of asphalt and aggregate. All of such materials experience weathering to varying degrees, with the relatively inexpensive asphalt composition shingles and commercial roofing typically being the most affected by prolonged exposure to UV radiation, temperature variations and other environmental conditions. Wood shingles are generally more durable than composition shingles and are more aesthetically pleasing. However, because of the flammability of wood shingles they have been banned in many areas as a fire hazard. Clay tile and slate roofs present little if any fire risk but are so expensive that they have not experienced widespread usage. Concrete shingles are extremely durable and fire resistant but are heavy in comparison to other types of materials. Concrete shingles also readily absorb water because of their porous nature, further adding to the load which must be supported by the structural elements of the roof. It can thus be seen that a need exists for a shingle or roofing element which is lightweight, fire and water resistant, and capable of withstanding the effects of weathering over a prolong time period.

Likewise, building elements such as flooring, blocks, beams, and other structural elements are made from a variety of materials such as concrete, wood, steel and the like. Each of these conventional materials has advantages as well as significant disadvantages. For example, steel provides a very high strength material for a use as structural beams, but the beams must be coated with a fireproof material because the beam is subject to failure when exposed to high temperatures. Moreover, the fireproofing material typically contains asbestos which has been shown to present a significant health risk. Wood is widely used for various building elements because it is inexpensive and provides satisfactory strength for many applications. Wood, however, is readily combustible and is subject to rot and insect damage. Reinforced concrete provides high strength structural elements but is heavy and can be significantly weakened by exposure to moisture which causes rusting of the metal reinforcing bars. A need thus exists for lightweight building elements which are fire and water resistant, generally impervious to rot or insect damage and are of sufficient strength for the desired applications.

SUMMARY OF THE INVENTION

It is an object of this invention to provide a building element which is water-resistant or waterproof and which is capable of withstanding weathering effects for a prolonged period of time so that it provides a superior performing alternative to conventional materials utilized for such building element.

It is another object of this invention to provide a binder composition which may be applied by various application methods or by pouring into a mold to form a building element as described, and which composition may be readily mixed and applied or poured so that it can be easily used for a wide range of purposes even by unskilled workers.

It is also an object of this invention to provide a building element such as a shingle or layered roofing which is impermeable to liquid water but which also has a limited permeability to water vapor so that vapor within a building to which the roofing is applied is capable of permeating through the roofing to prevent excessive buildup within the building.

It is a further object of this invention to provide a building element such as a structural beam or post which is unaffected by the presence of water so that it will maintain its strength for an extended period of time even in the presence of water.

It is a still further object of this invention to provide a fire-proofing coating which does not contain asbestos or other objectional material so that it may be used such as to coat steel beams within a building without presenting a health hazard to the occupants of the building.

To accomplish these and other related objects of the invention, a silicone rubber binder composition is provided which comprises a mixture of silicone rubber, a solvent for the silicone rubber, silicone dioxide and an aggregate material which may include sand, pearlite, clays, cinders, gravel and like material. The silicone rubber is preferably a room temperature vulcanizing (RTV) silicone while the solvent may comprise both aliphatic and aromatic hydrocarbons. A general formulation for the composition comprises:

between 2 and 20% by weight silicone rubber;
  between 0 and 50% by weight solvent;
  between 0 and 50% by weight water;
  between 5 and 35% by weight silicone dioxide;
  between 40 and 90% by weight aggregates or cellulosic fibers or a combination of both; and
  between 0 and 10% of a pigment.

In one presently preferred formulation the composition comprises:

3% by weight silicone rubber;
  7% by weight solvent capable of solubilizing the silicone rubber;
  18% by weight silicone dioxide; and
  72% by weight aggregate.

The silicone rubber in the cured composition acts as a binder to hold together the aggregate to form the desired building element which may be a shingle, roofing, beam, block, wallboard, post and the like, or may be a fireproofing coating such as for structural beams.

BRIEF DESCRIPTION OF THE DRAWINGS

In the accompanying drawings which form a part of the specification and are to be read in conjunction therewith.

DESCRIPTION OF THE PREFERRED EMBODIMENTS

Figure 1:
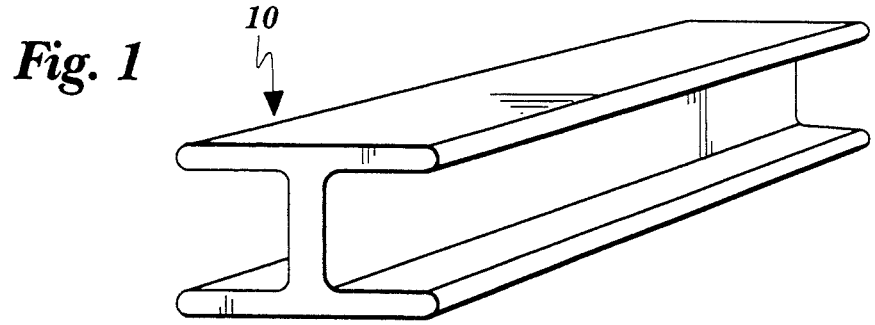
FIG. 1 is a perspective view of a beam formed in accordance with the present invention using a silicone rubber binder composition.

The composition according to the present invention comprises a silicone rubber dissolved in a solvent and mixed with a substantially dry mixture of silicone dioxide and aggregate. A general formulation for the composition comprises:

- between 2 and 20% by weight of a silicone rubber;
- between 0 and 50% by weight of a solvent capable of solubilizing the silicone rubber;
- between 0 and 50% of water for emulsifying the silicone rubber;
- between 5 and 35% by weight of silicone dioxide;
- between 40 and 90% by weight of cellulosic fibers or an aggregate or a combination of both; and
- between 0 and 10% of a pigment.

The basic process for the manufacture of silicone rubber is described in U.S. Pat. No. 2,380,955 which is incorporated herein by reference. As used herein, the term "silicone rubber" includes any polysiloxane which has been cross linked. Most silicone rubbers are predominantly methyl polysiloxane but the polymer may also contain other organic group substituents such as phenyl or vinyl on the polymer chain. A number of suitable silicone rubbers are disclosed in U.S. Pat. No. 2,448,756 which is also incorporated herein by reference. A suitable silicone rubber is dimethyl polysiloxane having a molecular weight of about 500,000.

The preferred silicone rubber for use in the present invention is a room temperature vulcanizing (RTV) silicone, although heat cured silicone rubbers could be used if desired. The RTV silicones are preferred because they are able to cross-link at room temperature through the addition of a catalyst or by moisture in the air. An example of a currently preferred silicone rubber is a thixotropic acetoxy RTV silicone rubber available from Rhone-Poulenc under the designation 222C.

Because the silicone rubber is typically the most expensive ingredient in the formulation, it is desirable to use as little silicone rubber in the composition as is possible while still providing the necessary adhesive strength for the final product formed from the composition. It has been determined that the RTV silicone rubber can be present in an amount of between 2 and 20% by weight of the total composition, desirably between 3 and 10% by weight, preferably between 3 and 5% by weight, and most preferably 3% by weight.

The solvent which is used to dissolve the silicone rubber should not react with the silicone rubber and may include both aliphatic and aromatic hydrocarbons such as mineral spirits, heptane, hexane, pentane, naphtha, toluene, xylene and chlorinated and fluorinated organic and inorganic solvents and silicone base solvents. The solvent may be selected from one or more of the following compounds: trichloroethane, methylene chloride, trichlorofluoromethane, dichlorodifluoromethane, chlorodifluoromethane, dichlorotetrafluoroethane, trifluoromethane, chloropentafluoroethane and trichlorotrifluoroethane. The preferred solvents are mineral spirits.

The solvent can be added to the silicone rubber in an amount of between 0 and 50% by weight of the total composition, desirably between 5 and 25% by weight, preferably between 7 and 10% by weight, and most preferably 7% by weight.

It is believed that in certain applications, the use of a solvent for solubilizing the silicone rubber may prove unnecessary. For example, a flowable RTV silicone rubber such as is available from Rhone-Poulenc under the product designation 420 or from General Electric Company under the designation 118 may be of a suitable consistency for mixing with the other ingredients in the formulation without requiring the use of a solvent. A water emulsion of flowable or other RTV silicone rubber could also eliminate the need for some or all of the solvent in the formulation. Such an emulsion would be less expensive than a solvent-based formulation and would be more environmentally suitable. Moreover, the water emulsion is particularly desirable because of its improved workability such as for troweling purposes and because it may be more easily pumped through conventional application equipment.

A water emulsion of RTV or flowable silicone rubber may be formed using various techniques such as with a suitable blender which should be designed to prevent the entry of air into the emulsion. If present in the formulation, the water should be added in an amount of between 5 and 50% by weight of the total composition, desirably between 5 and 25% by weight, preferably between 7 and 10% by weight, and most preferably 7% by weight. It may be desirable to use both solvent and water in certain embodiments of the formulation.

The silicone dioxide utilized in the composition should have a particle size of less than 45 microns with an average particle size of 9 microns. The silicone dioxide should have a minimum purity of 75%, with a purity of 95% being more preferred, and a purity of at least 99% being most preferred. The silicone dioxide acts as a filler in the cured product to fill the small voids between the larger sized aggregate. Because of its non-hygroscopic properties, the silicone dioxide does not absorb the silicone rubber, thereby reducing the amount of silicone rubber needed to bind together the aggregate and filler to form the desired final product.

The aggregates utilized in the present invention may be selected from various materials such as sand, pearlite, clays, cinders, gravel and the like. The size of the aggregates utilized will of course vary as required or desired for the intended usage of the composition. Selection of the type and size of aggregate for a particular application will be within the skill of those who are knowledgeable in the art, including those who are experienced in selecting aggregates types and sizes for concretes. As used herein, the term "aggregate" is intended to include those materials which are sized larger than would pass through a 100 screen mesh. The aggregates will usually, but not necessarily, have a size less than that which would pass through a 4 inch opening in a screen. Desirably, the aggregates are sized between an 80 screen mesh and a 3 screen mesh. In one preferred embodiment, the aggregates have a screen mesh size of between 20 and 40 mesh Together, the silicone dioxide and the aggregate comprise between 75 and 95% by weight of the total composition, preferably between 85 and 95% by weight, and most preferably 90% by weight. The relative amounts of silicone dioxide and aggregates utilized will vary depending upon the void space presented by the aggregates. In other words, large aggregates present a large void space between adjacent aggregates and more silicone dioxide filler will be required to fill such voids than would be required to fill the smaller void spaces between smaller sized aggregates.

It is believed that the silicone dioxide may comprise between 5 and 35% by weight of the total composition, with the aggregates forming between 40 and 90% by weight of the total composition. Desirably, the silicone dioxide comprises between 10 and 25% by weight, preferably between 15 and 20% by weight, and most preferably 20% by weight. The aggregates may thus comprise between 60 and 85% by weight of the total composition, preferably between 70 and 80% by weight, and most preferably 80% by weight.

Depending upon the desired application of the silicone rubber composition, additional filler material in the form of cellulosic fibers may be added to the formulation in place of or in addition to the aggregates. The cellulosic fibers may be provided instead of or in combination with the aggregates. The cellulosic fibers may be obtained from a variety of sources such as newspaper, cardboard, straw and sawdust which have been comminuted in a grinder or other device.

If desired, a pigment may be added to the composition when coloring is desired. If added, the pigment should be within the range of 5 to 10% by weight based on the total weight of the composition.

The silicone rubber, together with the solvent and water, if present, form a liquid first component of the binder composition, while the filler and aggregate form a dry second component of the composition. The wet and dry components of the composition of the present invention are mixed together using conventional mixing equipment and may be applied to a surface using conventional application equipment such as is used for the application of stucco. For example, the mixture may be spray applied to a building roof to a desired depth to form a layered roofing which is substantially impervious to weathering, is fire-resistant, and is impermeable to liquid water. Notably, such a roofing is permeable to water vapors and other vapors so that such vapors within the building may permeate through the roofing and be vented from the building. This vapor permeability thus substantially reduces undesirable vapor buildup within the building.

Figure 2:
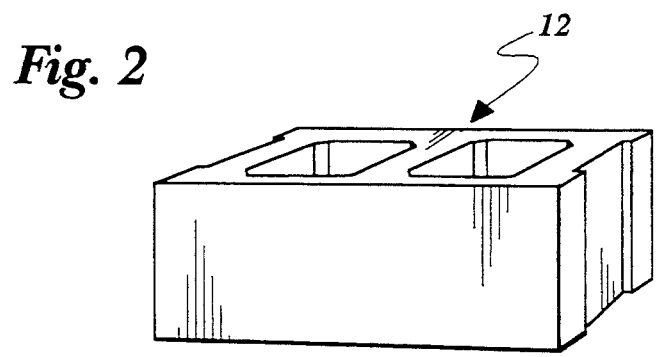
FIG. 2 is a perspective view of a block formed in accordance with the present invention using the silicone rubber binder composition.
Figure 3:
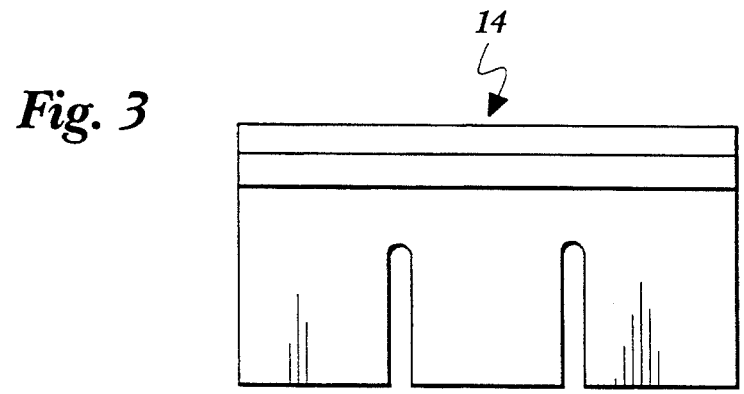
FIG. 3 is a top plan view of a shingle formed in accordance with the present invention using the silicone rubber binder composition.
Figure 4:
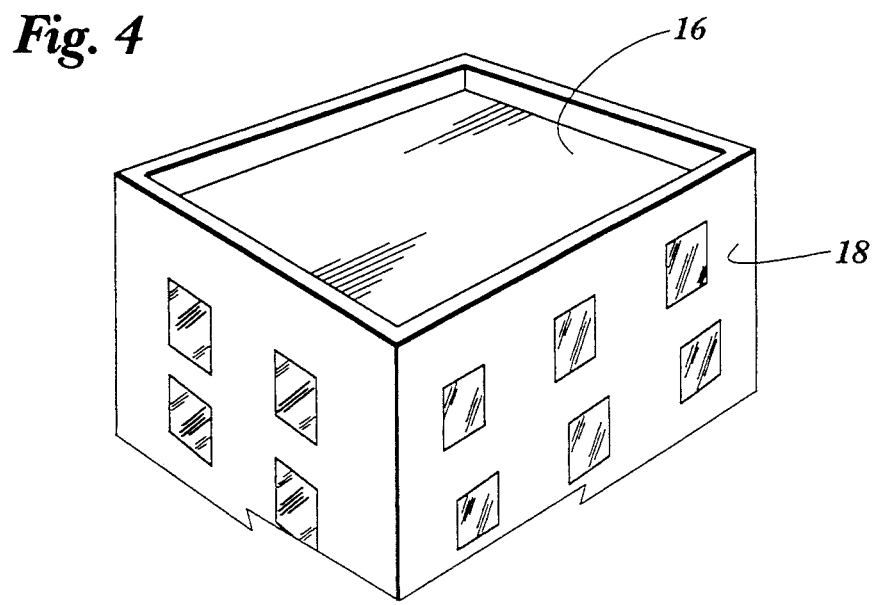
FIG. 4 is a perspective view of a flat composition roofing formed in accordance with the present invention using the silicone rubber binder composition.

When the desired product is a building element such as a pier, beam, block, wallboard, shingle and the like, the mixture is directed to a suitable mold for curing to form the shaped product. FIG. 1 illustrates one such product in the form of an I-beam 10 which may be used as a structural element in a building. The I-beam 10 is fire-resistant and waterproof and is generally unaffected by rot or insect damage. FIG. 2 illustrates another such product in the form of a block 12 which may be used to construct walls and other portions of buildings. The block 12 is likewise fire-resistant and waterproof and would be impervious to rot or insect damage. In FIG. 3, a shingle 14 which is a still further product possibility is illustrated. FIG. 4 shows a yet further product possibility which is a roofing 16 which has been spray applied to a building 18. It will be appreciated that the I-beam 10, block 12, shingle 14 and roofing 16 are but representative examples of the many different types of products that may be cast using the binder composition of the present invention.

The building elements formed form the silicone rubber binder of the present invention desirably have a final composition, by weight, of between 3 and 25% silicone rubber, 5 and 40% silicone dioxide, and between 45 and 90% aggregates and/or cellulosic fibers. Preferably, the building elements comprise, by weight, between 3 and 15% silicone rubber, between 10 and 30% silicone dioxide, and between 55% and 85% aggregates. Most preferably, the silicone rubber comprises 3% by weight, silicone dioxide comprises 17% by weight, and aggregates comprise 67% by weight of the building element.

The following examples are provided for purposes of illustration only and are not to be construed as limiting this invention.

EXAMPLE 1

A general formulation having particular applicability as a fireproofing coating such as for steel beams comprises:
(a) between 2 and 20% by weight of RTV silicone rubber;
(b) between 5 and 25% by weight of a solvent for the RTV silicone rubber;
(c) between 5 and 35% by weight of silicone dioxide; and
(d) between 60 and 85% by weight of pearlite.

The ingredients (a) and (b) are combined in a suitable mixing apparatus and then ingredients (c) and (d) are added and mixing is continued until a homogenous mixture is obtained. The resulting mixture may then be spray applied to beams or other surfaces using a spraying apparatus having a progressive cavity pump.

EXAMPLE 2

A composition is prepared by mixing together the following ingredients in the amounts indicated:
3% by weight of an acetoxy RTV silicone rubber (Rhone-Poulenc 222C);
7% by weight of a mineral spirits (Texaco-S/LO);
18% by weight of silicone dioxide; and
72% by weight of sand having a screen mesh size of between 20 and 40 mesh.

The mixture may then be applied to form a roofing coating using a spraying apparatus or may be molded to form another building element such as a shingle, beam, wallboard or the like.

EXAMPLE 3

A composition is prepared by mixing together the following ingredients in the amounts indicated:
3% by weight of an acetoxy RTV silicone rubber (Rhone-Poulenc 222C);
7% by weight of a mineral spirits (Texaco-S/LO);
18% by weight of silicone dioxide; and
72% by weight of cellulosic fibers.

The mixture may then be applied to form a roofing coating using a spraying apparatus or may be molded to form another building element such as a shingle, beam, wallboard or the like.

It can thus be seen that the binder composition of the present invention differs from conventional waterproofing and other silicone rubber compositions in that the aggregates comprise the substantial portion of the resulting coating or product with the silicone rubber acting much like a cement to bind together the aggregates. The presence of the silicone rubber in the composition provides tremendous advantages over the use of cements for such adhesion purposes in that the silicone rubber imparts waterproofing characteristics to the product and a resiliency unobtainable with cement.

It is to be understood that the foregoing description of the invention and the uses to which it may be put are only exemplary in nature. The scope of the invention is intended to be limited only by the appended claims.

Having thus described the invention, I claim:

1. A layered roofing comprising:
   between 3 and 25% by weight of a room temperature vulcanizing silicone rubber;
   between 5 and 40% by weight of silicon dioxide; and
   between 45 and 90% by weight of a quantity of aggregates.

2. The layered roofing of claim 1, wherein said room temperature vulcanizing silicone rubber is present in an amount of between 3 and 15% by weight.

3. The layered roofing of claim 1, wherein said silicon dioxide is present in an amount of between 10 and 30% by weight.

4. The layered roofing of claim 3, wherein said aggregates are present in a quantity of between 55 and 85% by weight.

5. A layered roofing comprising:
   3% by weight of a room temperature vulcanizing silicone rubber;
   between 10 and 30% by weight of silicon dioxide; and
   between 55 and 85% by weight of a quantity of aggregates.

6. A shingle comprising:
   between 3 and 25% by weight of a room temperature vulcanizing silicone rubber;
   between 5 and 40% by weight of silicon dioxide; and
   between 45 and 90% by weight of a quantity of aggregates.

7. The shingle of claim 6, wherein said room temperature vulcanizing silicone rubber is present in an amount of between 3 and 15% by weight.

8. The shingle of claim 7, wherein said silicon dioxide is present in an amount of between 10 and 30% by weight.

9. The shingle of claim 8, wherein said aggregates are present in a quantity of between 55 and 85% by weight.

10. The shingle of claim 9 wherein said room temperature vulcanizing silicone rubber is present in an amount of 3% by weight.

11. A block comprising:
    between 3 and 25% by weight of a room temperature vulcanizing silicone rubber;
    between 5 and 40% by weight of silicon dioxide; and
    between 45 and 90% by weight of a quantity of aggregates.

12. The block of claim 11, wherein said room temperature vulcanizing silicone rubber is present in an amount of between 3 and 15% by weight.

13. The block of claim 12, wherein said silicon dioxide is present in an amount of between 10 and 30% by weight.

14. The block of claim 13, wherein said aggregates are present in a quantity of between 55 and 85% by weight.

15. The block of claim 14, wherein said room temperature vulcanizing silicone rubber is present in an amount of 3% by weight.

* * * * *